Figure 2:
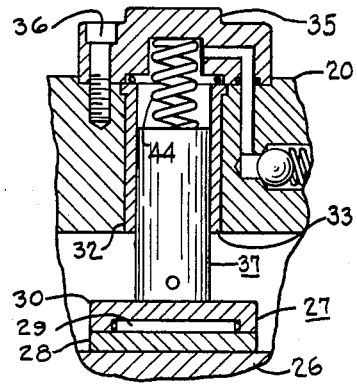

July 13, 1954     T. E. RAYMOND     2,683,423

FLUID PRESSURE ENERGY TRANSLATING DEVICE

Filed Aug. 30, 1950

*INVENTOR.*
THOMAS E. RAYMOND
BY
*his attorney*

Patented July 13, 1954

2,683,423

UNITED STATES PATENT OFFICE 2,683,423

FLUID PRESSURE ENERGY TRANSLATING DEVICE

Thomas E. Raymond, Zanesville, Ohio, assignor to Simplex Engineering Company, Zanesville, Ohio, a corporation of Ohio Application August 30, 1950, Serial No. 182,198

1 Claim. (Cl. 103—174)

The present invention relates to a fluid pressure energy translating device and is directed to improvements on the device shown in my Patent Number 2,461,235 issued February 8, 1949. The improvement is directed particularly to the eccentrically actuated ring which is utilized to drive a piston in one direction when relative rotary movement is imparted between the ring and eccentric.

In accordance with the present invention, relative rotatable movement is imparted between the eccentric and the eccentrically actuated ring and in the instant application, for illustrative purpose, the eccentric is rotated relative to the ring. Upon relative rotation of the eccentric and eccentrically actuated ring, movement is imparted to a piston or pistons through the movement of the ring. One of the objects of the present invention is to provide an eccentrically actuated ring having a bearing surface which substantially complements the bearing surface through which the piston is actuated. In the instant disclosure the head of the piston is flat where it engages with the ring and consequently the head engaging surface of the eccentrically actuated ring, or polygonal block, is also flat.

A further object of the present invention is to provide an oil passage from the interior of the piston, through the head so as to deliver lubricant under pressure to the bearing surfaces of the ring and head of the piston.

Further objects and advantages of the present invention will be apparent from the following description, reference being had to the accompanying drawings wherein a preferred form of embodiment of the invention is clearly shown.

Figure 1:
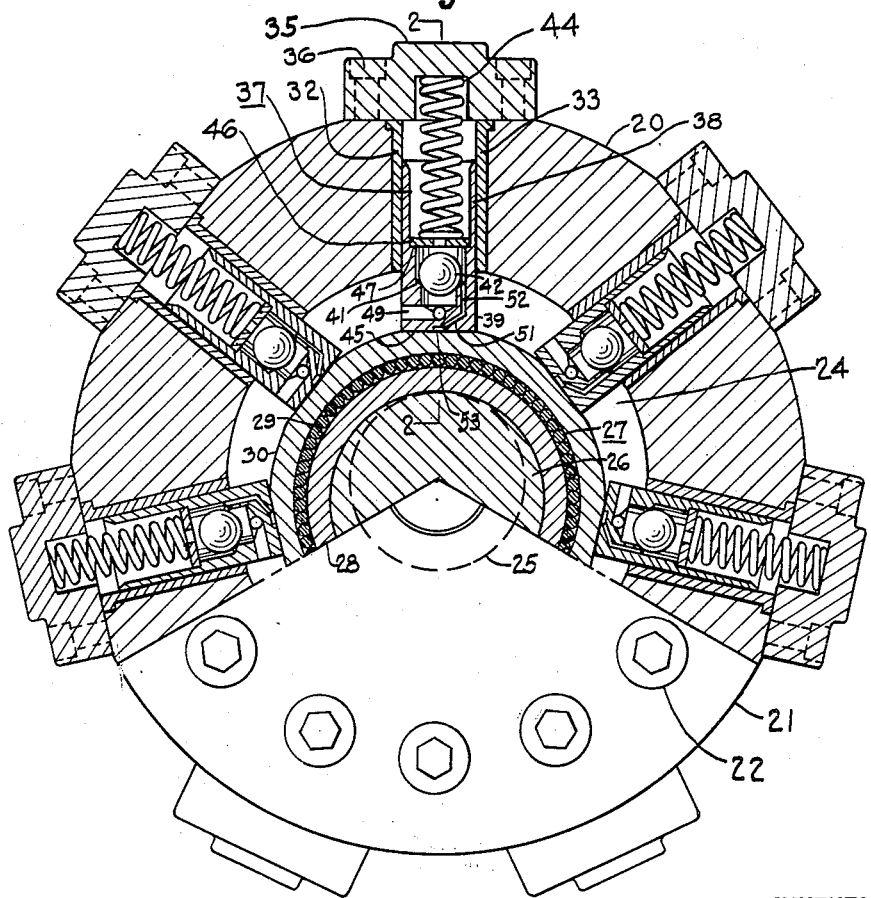

In the drawings:

Fig. 1 is a vertical transverse section similar to that shown in Fig. 2 of my Patent Number 2,461,235; and Fig. 2 is a fragmentary sectional view taken on line 2—2 of Fig. 1 showing the eccentrically actuated ring and piston in elevation.

Referring more in detail to the drawing, the fluid pressure energy translating device is shown, for illustrative purposes, as a pump comprising a substantially circular casing 20 which is closed at the opposite ends by end caps, one of which is shown at 21. The caps are held in place by screws 22. The interior of the casing is substantially cylindrical to form a chamber 24. A shaft extends through one of the end caps and is shown in dotted line at 25 and an eccentric 26 is formed integrally therewith. A needle bearing, generally indicated at 27, surrounds the eccentric 26. This needle bearing includes an inner race in the form of a ring 28, tightly secured to the periphery of the eccentric 26, needle bearings 29 and an outer race in the form of a ring 30.

A plurality of cylindrical recesses 32 extend radially outwardly through the casing 20 from the chamber 24. Preferably there are seven of these recesses, equally spaced from one another and arranged in the same vertical plane. Each of these recesses has a tightly fitting sleeve 33 therein and each provides a cylinder. The ends of the cylinders are closed by caps 35 held in place by screws 36. Each of these cylinders 33 carries a piston 37 having a skirt 38 and a head 39. The inner end of the skirt terminates in a seat 41 for a ball valve 42. A coil spring 44 is interposed between the underside of the cap 35 and a perforated disc 46. The perforated disc 46 abutts a shoulder 47 on the interior of the piston so that the piston is constantly urged inwardly by the spring 44. Fluid to be pumped is lead into the chamber 24 in any suitable manner whence it flows through passages 49 to the interior of the piston when the piston is urged inwardly by the spring, lifting the ball valve 42 from its seat. When the piston is moved outwardly, the ball valve 42 is seated and the fluid thereabove is forced outwardly as is clearly shown and disclosed in my Patent Number 2,461,235.

In the instant application the outer ring 30 of the needle bearing 27 has a plurality of non-circular bearing surfaces, one for each of the pistons and the heads of the pistons are constantly urged against these bearing surfaces by the springs 44. The confronting bearing surface of the head 39 and the peripheral bearing surface of the ring 30 are complementary. For practical purposes I prefer that the bearing surface of the head and the peripheral bearing surfaces of the ring 30 be flat as shown at 45. Thus upon relative rotary motion being imparted to the eccentric 26 and the ring 30, a large bearing surface is presented between the ring 30 and the head of the piston, insuring long life because the bearing surfaces are distributed over wide areas.

The casing 21 together with the pistons can be caused to be rotated or the shaft 25 and eccentric 26 caused to be rotated. In the instant embodiment, the shaft 25 and eccentric 26 are rotated. All tendency of rotation of the ring 30 through the needles 29 is overcome by the tension of the springs 44 whereby the ring 30 does not rotate relative to the eccentric 26.

To insure high pressure lubrication of the bearing surfaces between the head 39 and the flats 45 of ring 30, an orifice 52 leads from the interior of the piston through the head to a somewhat larger recess 53 in the head 39. Thus fluid is forced under high pressure from the interior of the piston to the bearing surfaces between the head and the ring 30.

While the present invention has been described as being applied to a pump, it will be understood by those skilled in the art, that the same invention is applicable to a fluid pressure motor.

While the form of embodiment of the present invention as herein disclosed constitutes a preferred form, it is to be understood that other forms might be adopted, all coming within the scope of the claim which follows.

I claim:

A pump comprising a casing having walls forming a chamber; a shaft extending into the chamber; an eccentric in the chamber and secured by the shaft for rotation with the latter; a ring about the eccentric, said ring having a series of substantially flat bearing surface portions spaced from one another about the periphery of the ring and spaced radially inwardly of the wall of the chamber; a plurality of cylinders in a wall of the casing, each extending substantially radially about the axis of the shaft; a plurality of cylindrical pistons, one for each of the cylinders, each piston including a head and an integral skirt, the skirt of the piston lying radially outwardly of the head with respect to the axis of the shaft, said head having an outer wall and an inner wall, said head having a substantially flat bearing surface on the outer wall thereof, complementing a bearing surface on said ring; means for urging the bearing surface of the head against a bearing surface of the ring, the inner wall of said head forming a valve seat, said head forming a passage for fluid to be pumped from the interior of the chamber to the interior of the skirt and cylinder, one end of said passage terminating at the outer cylindrical surface of the head and the other end of said passage terminating at the valve seat; a valve in the piston cooperating with the valve seat for preventing flow of fluid from the interior of the skirt through said passage, said head having formed therein a second passage, one end of the latter passage being in open communication with the interior of the skirt portion of the piston above said valve and the other end of the second mentioned passage terminating at substantially the center of the outside face of said substantially flat surface of the piston head whereby high pressure fluid is conducted from the interior of the piston skirt to the substantially flat bearing surface portion of the eccentric.

References Cited in the file of this patent

UNITED STATES PATENTS

| Number | Name | Date |
|---|---|---|
| 1,920,123 | Ernst | July 25, 1933 |
| 2,345,125 | Huber | Mar. 28, 1944 |
| 2,347,663 | Carnahan | May 2, 1944 |
| 2,461,235 | Raymond | Feb. 8, 1949 |

FOREIGN PATENTS

| Number | Country | Date |
|---|---|---|
| 96,030 | Switzerland | 1922 |